US 9,916,235 B2

(12) United States Patent
Magill et al.

(10) Patent No.: US 9,916,235 B2
(45) Date of Patent: Mar. 13, 2018

(54) CODE FAILURE LOCATOR

(71) Applicant: Seagate Technology LLC, Cupertino, CA (US)

(72) Inventors: Michael G. Magill, Westminster, CO (US); Benjamin Cordova, Longmont, CO (US); Scott States, Broomfield, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/232,514

(22) Filed: Aug. 9, 2016

(65) Prior Publication Data

US 2018/0046571 A1  Feb. 15, 2018

(51) Int. Cl.
*G06F 9/44* (2006.01)
*G06F 11/36* (2006.01)
*G06F 9/45* (2006.01)
*G06F 11/00* (2006.01)

(52) U.S. Cl.
CPC .................. *G06F 11/3692* (2013.01)

(58) Field of Classification Search
CPC ............. G06F 11/1469; G06F 11/1461; G06F 11/366; G06F 11/362; G06F 11/3692; G06F 11/3688; G06F 11/3668; G06F 11/3632; G06F 8/71; G06F 8/34; G06F 17/28; G06Q 10/10; G06Q 10/06
See application file for complete search history.

(56) References Cited

U.S. PATENT DOCUMENTS

| 9,021,428 | B2* | 4/2015 | Ajith Kumar | G06F 11/3612 715/230 |
| 9,043,924 | B2* | 5/2015 | Maor | G06F 11/3688 726/25 |
| 9,292,281 | B2* | 3/2016 | Balachandran | G06F 11/3636 |
| 9,430,194 | B1* | 8/2016 | Childs | G06F 8/33 |
| 9,594,553 | B2* | 3/2017 | Ji | G06F 8/75 |

(Continued)

OTHER PUBLICATIONS

Visan et al., URDB: a universal reversible debugger based on decomposing debugging histories, Oct. 2011, 5 pages.*

(Continued)

*Primary Examiner* — Thuy Dao
(74) *Attorney, Agent, or Firm* — Westman, Champlin & Koehler, P.A.

(57) ABSTRACT

A method includes performing an integration test on executable software units. The integration test fails and identifies a symptomatic executable software unit at which the failure of the integration test is detected. One or more modified source code files, including instructions likely responsible for the failure of the integration test, are located from a plurality of modified source code files. The location involves searching a binary change database for change history records relating to both the plurality of modified source code files and the executable software units. Degrees of functional interaction between portions of modified source code files corresponding to the change history records and portions of a source code file corresponding to the symptomatic executable software unit are determined. Based on this determination, the modified source code file(s) including the instructions likely responsible for the failure of the integration test are identified.

16 Claims, 7 Drawing Sheets

(56) References Cited

U.S. PATENT DOCUMENTS

| | | | |
|---|---|---|---|
| 9,703,552 B2* | 7/2017 | Bates | G06F 8/71 |
| 2004/0205717 A1* | 10/2004 | Chiang | G06F 11/362 |
| | | | 717/124 |
| 2008/0244522 A1 | 10/2008 | Bernin | |
| 2009/0249298 A1* | 10/2009 | Blount | G06F 8/70 |
| | | | 717/125 |
| 2012/0017195 A1 | 1/2012 | Kaulgud et al. | |
| 2012/0054553 A1 | 3/2012 | Artzi et al. | |
| 2012/0117041 A1* | 5/2012 | Rodriguez | G06F 11/362 |
| | | | 707/702 |
| 2012/0167040 A1* | 6/2012 | Davies | G06F 11/3604 |
| | | | 717/110 |
| 2013/0047141 A1* | 2/2013 | Shann | G06F 11/3664 |
| | | | 717/128 |
| 2014/0282459 A1 | 9/2014 | Hey et al. | |
| 2015/0113505 A1 | 4/2015 | Krueger | |
| 2015/0370685 A1 | 12/2015 | Heymann et al. | |

OTHER PUBLICATIONS

Wang et al., Version history, similar report, and structure: putting them together for improved bug localization, Jun. 2014, 11 pages.*
Sandoval Alcocoer et al., Learning from Source Code History to Identify Performance Failures, Mar. 2016, 12 pages.*

* cited by examiner

CODE FAILURE LOCATOR

BACKGROUND

Software code development efforts result in the delivery of a software product. Once the software product is in operation, defects may be uncovered, operating environments may change, and new needs may surface. Thus, maintenance or support for the software product is needed. The objective of software maintenance is to modify existing software while preserving its integrity.

Software engineers in an organization that develops and maintains software typically make their best effort to share written code features (e.g., individual code units such as functions or modules). Changes to the shared code features may be tracked by "checking in" the changes (e.g., modified files) to a common/centralized revision control system shared by the developers/engineers of the organization. Modified source code may be provided from the revision control system to a code building system that may compile the code and produce build results, which may include executable files. Tests may be carried out by running the executable files under different test conditions.

In organizations having large codebases and a large number of developers, the software code may undergo numerous changes over a relatively short period of time. This high change rate may necessitate code testing in batches (e.g., an integration test). The discovery of a break or failure in a batch of changes may mean that the break could have occurred anywhere in the range of changes tested. Narrowing down a range of changes to a single offending change may be substantially time and resource consuming.

SUMMARY

The present disclosure relates to code failure location when an error occurs during software integration testing.

In one method embodiment, an integration test is performed on a plurality of executable software units. The integration test fails and responsively identifies a symptomatic executable software unit, of the plurality of executable software units, at which the failure of the integration test is detected. The method further includes locating one or more modified source code files, including instructions likely responsible for the failure of the integration test, from a plurality of modified source code files. Locating the modified source code file(s) includes searching a binary change database to obtain change history records that relate to both the plurality of modified source code files and the plurality of executable software units. Degrees of functional interaction between portions of modified source code files corresponding to the obtained change history records and portions of a source code file corresponding to the symptomatic executable software unit are then determined. Based on the determined degrees of functional interaction, the one or more modified source code files including the instructions likely responsible for the failure of the integration test are identified.

This summary is not intended to describe each disclosed embodiment or every implementation of the code failure locator. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

The present disclosure relates to code failure location when an error occurs during software integration testing.

Figure 1:
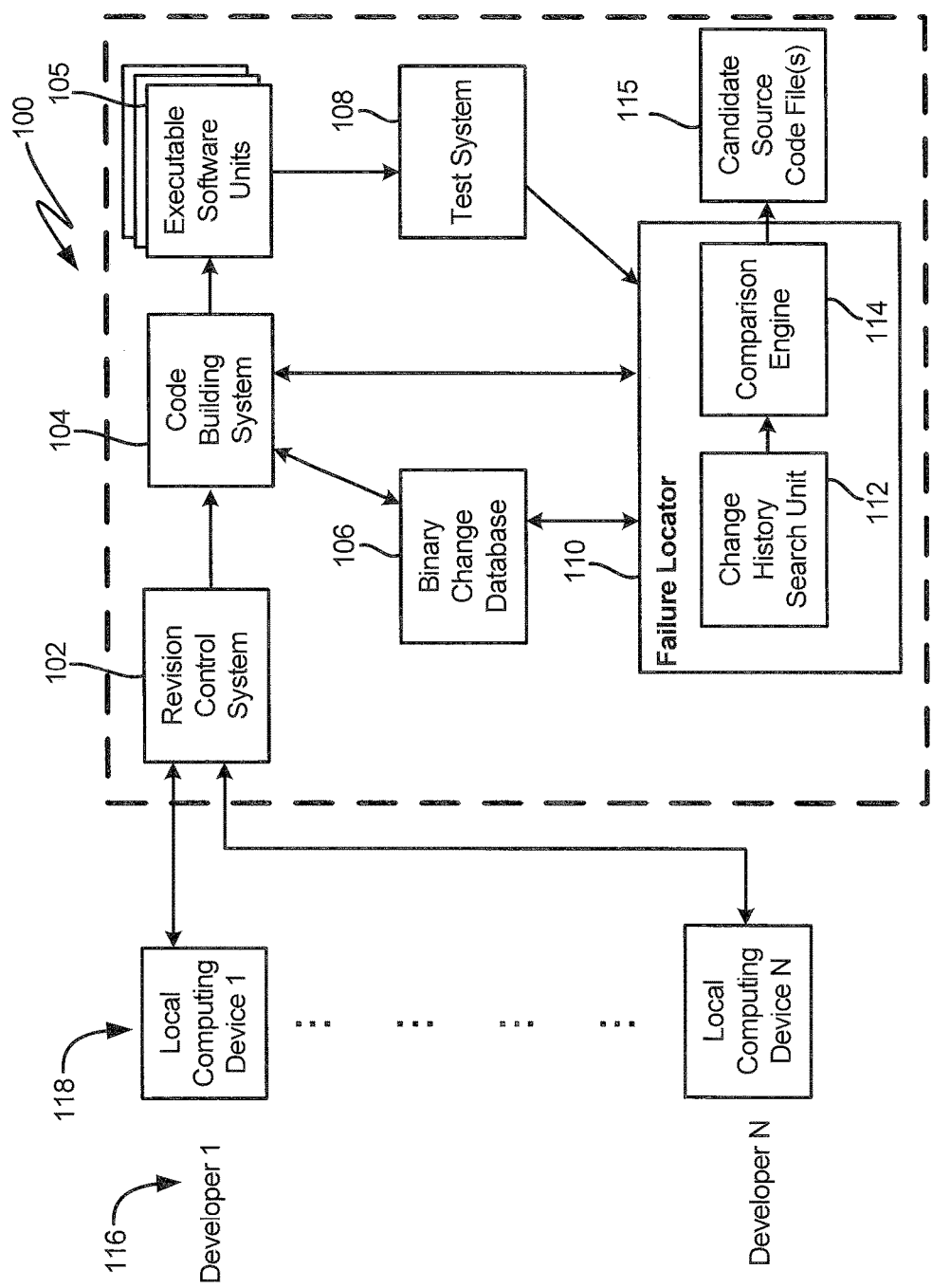
FIG. 1 is a simplified block diagram of a system for locating source code defects when a software integration tests fails.

FIG. 1 shows an overall system 100 according to one embodiment for locating source code defects when a software integration tests fails. As can be seen in FIG. 1, system 100 includes a revision control system 102, a code building system 104, a binary change database 106, a test system 108 and a code failure locator tool 110. Although separately shown in the embodiment of FIG. 1, in some embodiments, at least some of units/components 102-110 of system 100 may be combined into a single unit.

Software developers 116 working in one or more teams may utilize local computing devices (e.g., personal computers) 118, which communicate with system 100, to write new source code and to change existing source code. Additions and changes to the source code (e.g. files) are managed by revision control system 102, which may track individual source code changes made by each developer 116 and prevent concurrent code modifications from conflicting. Developers 116 "check in" new and modified source code files to revision control system 102. Also, developers 116 "check out" latest versions of source code files from revision control system 102 when those source code files may need to be modified. It should be noted that "source code files" may include not only source code of programs but also configuration files and other artifacts that can affect the behavior of a software program. The modified source code files may be submitted to code building system 104.

Code building system 104 compiles received source code files and produces build results 105, which may include executable software units (e.g., executable object files). The executable software units 105 may be stored in a database in system 100. In some embodiments, code building system 104 may produce two or more build results (e.g., variants) based on a single source code component (e.g., a single source code file). Each variant may be intended for use in a different execution environment. Each different execution environment is referred to herein as a target.

In some embodiments, as part of a compile operation, code building system 104 may also generate change records that identify any changes in different files since a last build of those files was carried out. In some embodiments, the change records are created by the code building system 104 in response to receiving build instructions that include an identifier that signals the system 104 to generate the change records. In some embodiments, the changes records comprise binary changes identified in the built files. The changes records identifying the binary changes are stored in a binary change database 106. In some embodiments, at the end of the compile operation, the code building system 104 saves hashed versions of the identified changes in the binary change database 106. In one embodiment, a 32 character hash value of identified changes is stored in the binary change database 106 as the respective change record for each modified file.

As noted above, system 100 further includes a test system 108. Test system 108 is capable of running the executable software units 105 to determine the correct behavior of those units. The test system 108 can output test results for a test that was run. As indicated earlier, in organizations having large codebases and a large number of developers, the software code may undergo numerous changes over a relatively short period of time. This high change rate may necessitate testing of executable software units 105 in batches. Thus, test system 108 may carry out integration testing of a batch of executable software units 105. As noted above, the discovery of a break or failure in a batch of changes by the test system 108 may mean that the break could have occurred anywhere in the range of changes tested. Upon failure of the integration test, the test system 108 may identify a symptomatic executable software unit, of the batch of executable software units, at which the failure of the integration test is detected. However, the test system 108 may not be capable of searching modified source code files to narrow down the range of changes to a single offending change (or a small group of likely offending changes). Accordingly, information output by the test system 108 upon failure of the integration test may be provided to code failure locator tool 110.

Code failure locator tool 110 is capable of locating one or more modified source code files, including instructions likely responsible for the failure of the integration test, from a large range of file changes. To help narrow the ranges of changes to one or more offending changes, code failure locator tool 110 may include a change history search unit 112 and a comparison engine 114.

Change history search unit 112 searches binary change database 106 for records of a change history that relate to both the modified source code files and the batch of executable software units 105. As will be described in detail further below, change history search unit 112 may include a change record filter function that may receive a starting change record identifier, an ending change record identifier, and a binary changes filter, and responsively query database 106 to obtain records of the change history that relate to both the plurality of modified source code files and the plurality of executable software units. The records obtained from binary change database 106 by change history search unit 112 are provided to comparison engine 114.

Comparison engine 114 determines degrees of functional interaction between portions of modified source code files corresponding to the obtained records of the change history and portions of a source code file corresponding to the symptomatic executable software unit. Based on the determined degrees of functional interaction, comparison engine 114 identifies one or more modified source code files including instructions likely responsible for the failure of the integration test. In comparison engine 114, determining the degrees of functional interaction and identifying the one or more modified source code files may be carried out by a hybrid genetic depth limited search algorithm (HGDLSA), which is described in detail further below. Comparison engine 114 may output a prioritized/ordered list of candidate modified source code files 115.

Details regarding how code failure locator tool 110 searches binary change database 106 and executes the HGDLSA are provided below in connection with FIGS. 2-6.

Figure 2:
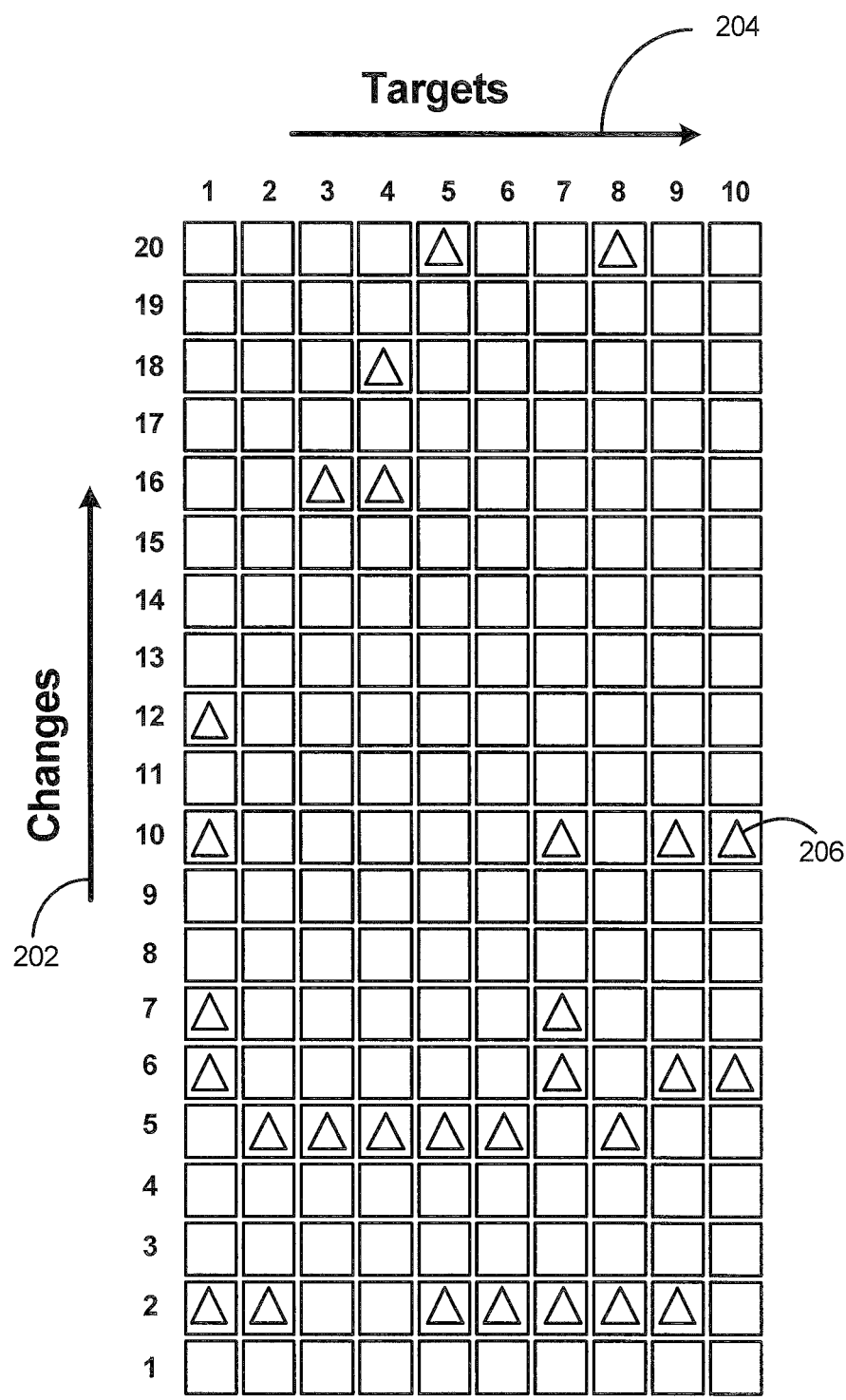
FIG. 2 is a graph showing a relationship between software code changes and build results for different targets.

FIG. 2 illustrates a graph 200 that depicts a relationship between modified source code files that developers 116 (shown in FIG. 1) have "checked in" to revision control system 102 (of FIG. 1) and corresponding change records generated by code building system 104 (of FIG. 1) for different targets.

In FIG. 2, a vertical axis 202 is used to identify "most recent" twenty modified source code files (e.g., Change 1-Change 20). Different build targets (e.g., Target 1-Target 10) are identified along a horizontal axis 204. A delta symbol 206 indicates a change in a software executable unit output by code building system 104 (of FIG. 1) for a particular modified source code file and target relative to a prior version of that software executable unit. Each delta symbol 206 corresponds to one row in the binary change database 106 (of FIG. 1). In the example shown in FIG. 2, it is seen that most source code file modifications do not affect every target. In FIG. 2, for a particular target, one column corresponds to a list of binary changes for that target over time. For example, for Target 1, there are only five binary changes in the range Change 1 to Change 20.

As indicated earlier, a suitable change record filter function may be utilized to obtain a binary changes history (e.g., five binary changes) for a particular target (e.g., Target 1) from the binary change database 106 (of FIG. 1). The function may employ Structured Query Language or any other suitable language for querying database information. One such change record filter function may receive a starting change record identifier (e.g., Change 1), an ending change record identifier (e.g., Change 20), a binary changes filter (e.g., a "b" command line option) and a target identifier (e.g., Target 1), and responsively query database 106 (of FIG. 1) to obtain records of the change history. It should be noted that the binary changes filter is utilized to eliminate records that may have no binary changes for a particular target (e.g., eliminate records in database 106 (of FIG. 1) that correspond to changes in the first column of FIG. 2 for Target 1 without delta symbols 206).

Figure 3:
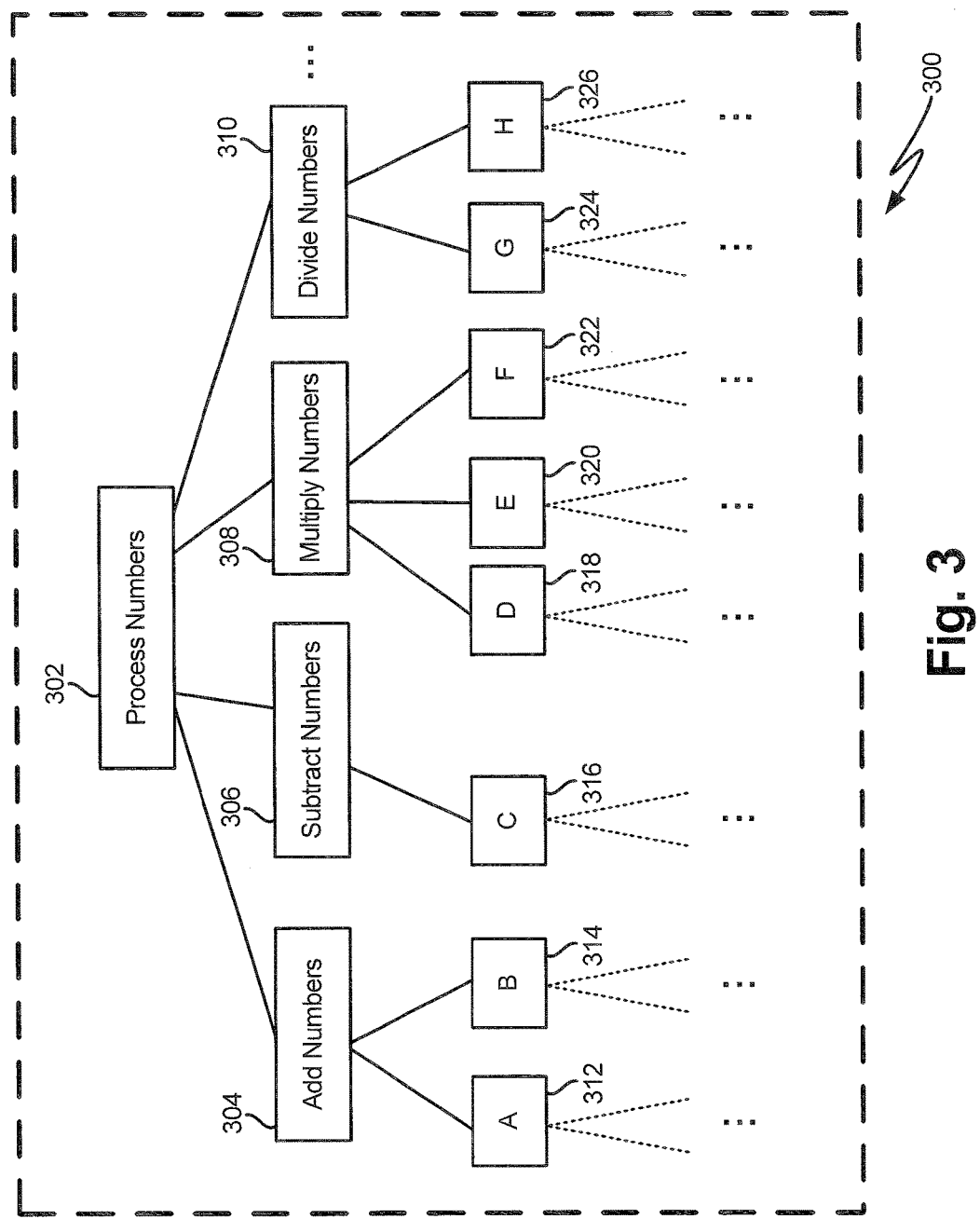
FIG. 3 is a diagrammatic illustration of an example software system including multiple functions.

FIG. 3 shows an example of a software system 300 having software code functions that may be included in files that are modified and "checked in" to revision control system 102 (of FIG. 1). In FIG. 3, the functions shown in system 300 include a Process Numbers function 302, an Add Numbers function 304, a Subtract Numbers function 306, a Multiply Numbers function 308, a Divide Numbers function 310 and several other functions (e.g., A 312, B 314, C 316, D 318, E 320, F 322, G 324 and H 326).

Of the functions shown in FIG. 3, Process Numbers function 302 is a main function that calls first lower level functions such as Add Numbers function 304, Subtract Numbers function 306, Multiply Numbers function 308 and Divide Numbers function 310. First lower level functions 304, 306, 308 and 310 in turn may call one or more of second lower level functions A 312, B 314, C 316, D 318, E 320, F 322, G 324 and H 326, and those functions may call additional lower level functions that are not shown. It should be noted that the functions shown in FIG. 3 may be a small subset of a very large number of functions in software system 300.

Test system 108 (of FIG. 1) may carry out integration testing of a batch of executable software units including the functions 302-326 shown in FIG. 3 and a number of other functions of system 300, which are not shown. A failure in the integration test may occur, and test system test system 108 may identify a symptomatic executable software unit or symptomatic function (e.g., Process Numbers function 302). If Process Numbers function 302 is identified as a symptomatic function, a code change to any of functions 304-326 or any of the additional lower level functions that are not shown may have caused Process Numbers function 302 to fail. Narrowing down a range of changes to a single offending change that may have caused Process Numbers function 302 to fail is carried out by code failure locator tool 110 (of FIG. 1).

Figure 4:
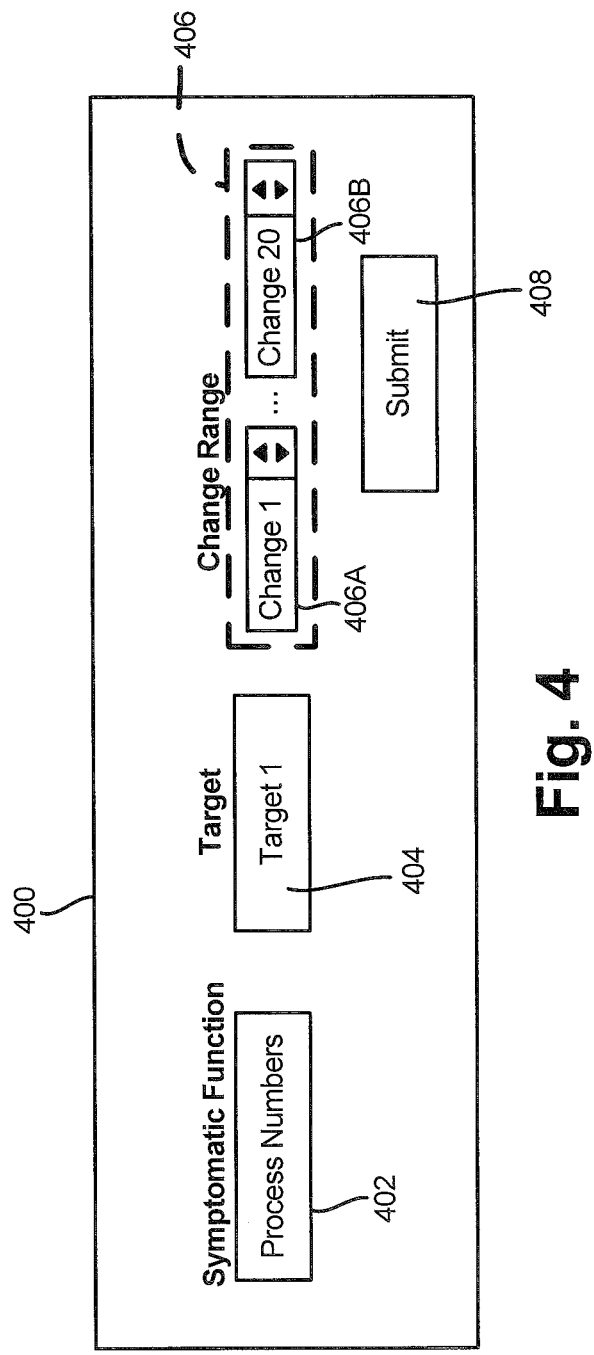
FIG. 4 is a diagrammatic illustration of a form that may be employed to submit information related to a failed integration test into a code failure locator.

In one embodiment, information related to the failure of the integration test is entered into a form 400 that is shown in FIG. 4. Form 400 may be a part of code failure locator tool 110 (of FIG. 1) or code building system 104 (of FIG. 1). As can be seen in FIG. 4, form 400 may include a symptomatic function field 402, a target field 404, change range fields 406 and a submit button 408. A user may, with the help of a computer input device (e.g., a keyboard), enter the symptomatic function name or identifier (e.g., Process Numbers) into field 402 and enter the target of interest (e.g., Target 1) into field 404. The user may then, with the help of the computer input device (e.g., mouse/keyboard), select/enter a starting change identifier (e.g., Change 1) in field 406A and select/enter an ending change identifier (e.g., Change 20) in field 406B. The user may then submit the filled form 400 by, for example, positioning a cursor on a submit button 408 of the form 400 and then clicking a button on the mouse to complete the submission of form 400.

In some embodiments, submission of the form 400 may trigger code building system 104 (of FIG. 1) to automatically compile source code files that include the range of changes identified in the form 400 (e.g., Change 1-Change 20) for the submitted target (e.g., Target 1). In such embodiments, after the build completes and passes, change history search unit 112 of code failure locator tool 110 (of FIG. 1) searches binary change database 106 (of FIG. 1) for suspected offending changes using, for example, the earlier-described change record filter function, which obtains a filtered list of changes. It should be noted that a build of the source code files needs to be carried out after form 400 is submitted if a change history for those source code files is unavailable in binary change database 106 (of FIG. 1) due to, for example, purging of old database records. However, if the change records of interest are in binary change database 106 (of FIG. 1), a build need not be carried out after the form 400 is submitted, and the change record filter function may be executed (without the build) to obtain the filtered list of change records.

Figure 5:
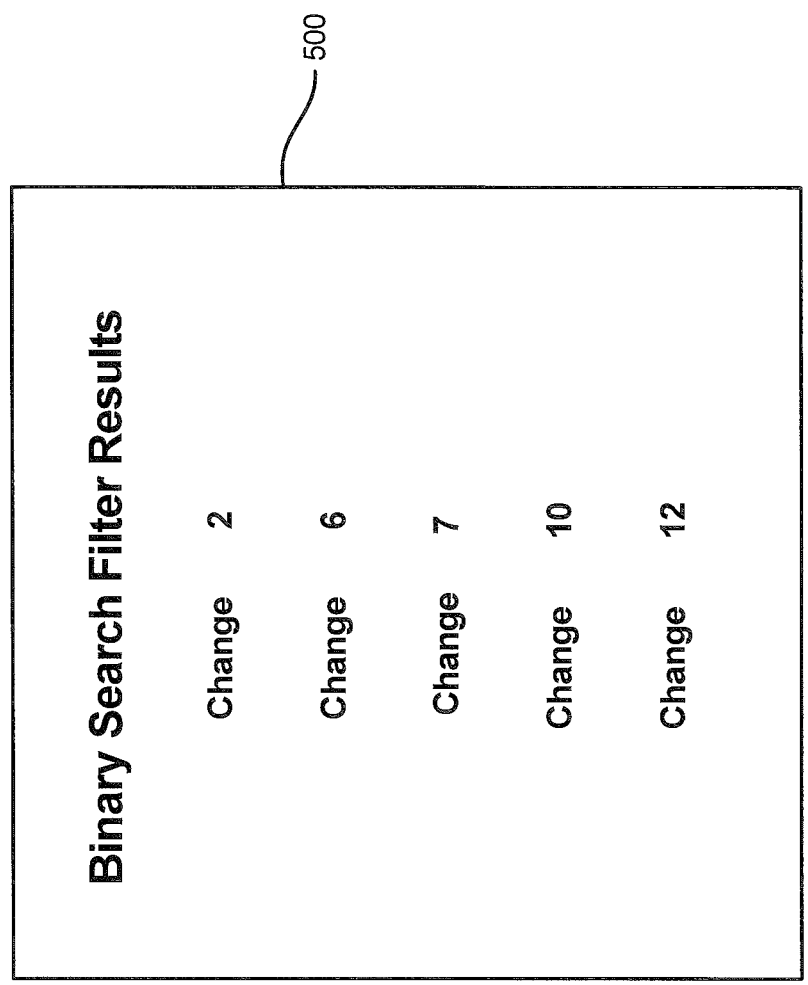
FIG. 5 shows an example of binary search filter results.

FIG. 5 shows an example of binary search filter results that may be obtained when change record filter function is executed upon receiving Change 1 as a starting change record identifier and Change 20 as an ending change record identifier from form 400. In this example, a list of changes that may be relevant are reduced from 20 to 5 (e.g., the five changes for Target 1 (of FIG. 2) that include delta symbols 206 (in FIG. 2)). From a small list of five changes, it may be possible for a developer to manually locate the modified source code file(s) including the instructions likely responsible for the failure of the integration test. However, as noted above, a software code system such as 300 may include a large numbers of functions included in a corresponding large number of source code files. Thus, the binary search filter results (e.g., the change records obtained by change history search unit 112) are typically fed to comparison engine 114 (of FIG. 1).

As noted above, in some embodiments, the comparison engine 114 (of FIG. 1) executes a HGDLSA to determine degrees of functional interaction between portions of modified source code files corresponding to the obtained change records and portions of a source code file corresponding to the symptomatic executable software unit. In some embodiments, comparison engine 114 (of FIG. 1) carries out this determination by modeling function associations in the modified source code files and the source code file corresponding to the symptomatic executable software unit as directed code graphs to locate overlapping areas of influence.

Figure 6:
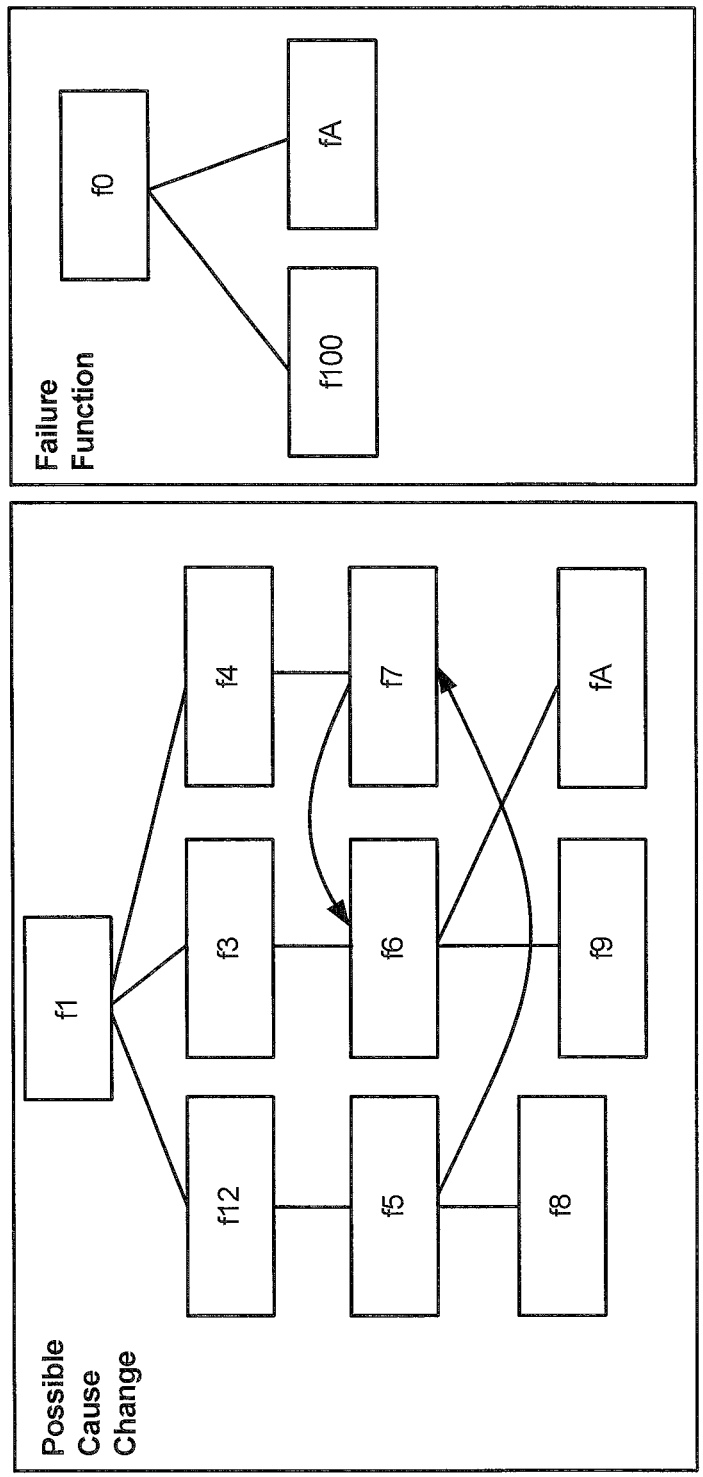
FIG. 6 is a diagrammatic illustration showing a change function tree and a failing function tree.

Accordingly, for the example provided above, function associations in the modified source code file associated with the changes listed in FIG. 5 and the source code files corresponding to Process Numbers function 302 (of FIG. 3) are modeled as directed code graphs to locate overlapping areas of influence. The directed code graphs include nodes and links between the nodes. The nodes in the directed code graphs may correspond to functions (e.g., Add Numbers function 304, Subtract Numbers function 306, function A 312, function B 314, etc., shown in FIG. 3) and the links in the directed code graphs may correspond to associations between functions. For example, if Add Numbers function 304 calls function A 312, a directed code graph may include a first node that represents Add Numbers function 304, a second node that represents function A 312 and a link between the first and second nodes. Due to the numerous links between functions shown in the example of FIG. 3, complex directed code graphs are needed to explain the operation of the HGDLSA in connection with the software code system 300 of FIG. 3. Therefore, for purposes of explaining the HGDLSA, a relatively simple general example including a first directed code graph with interconnections of functions associated with changes records (e.g., the change records obtained by change history search unit 112 (of FIG. 1)) and a second directed code graph including function associations in the source code file corresponding to the symptomatic executable software unit is shown in FIG. 6. The first directed code graph with interconnections of functions associated with changes records is referred to as a change function tree and the second directed code graph including function associations in the source code file corresponding to the symptomatic executable software unit is referred to as a failing function tree. Different functions (e.g., f0, f1, f2, etc.) are represented as nodes in the respective trees. The nodes are linked as show in FIG. 6.

A basic genetic algorithm, which is a foundation for the HGDLSA, includes two primary components which help determine how the algorithm arrives at a solution. These are the genotype and the phenotype. A genotype describes a specific segment of a solution and the phenotype is what results from that genotype when combined with a full sequence. In a search solution, the genotype and phenotype indicate certain combinations of decisions or node values that optimize an input problem.

A first step in addressing a problem is to create an encoding of the problem. In a search tree, the paths or selected nodes may be marked as enumerated at that node. For example, in FIG. 6, assigning an enumeration f1 to 0 and encoding of the function representation f1, f2, f5, f7 would result in 0001. As another example, an enumeration 0100 is created from the functional path f1, f3, f6, f6. Each different path may be a different genotype. A reverse process to create a phenotype from a genotype is performed by beginning at a primary function node (f1 in this example) and then following the decision paths through each depth based on which decision is requested. A phenotype is a candidate solution. The basic genetic algorithm is iterative in nature and evolution of a generation of candidate solutions takes place during each iteration. Evolution in the basic genetic algorithm includes steps such as crossover (producing a child solution from more than one parent solution), mutation (modifying a single parent solution), and selection to optimize a heuristic.

The HGDLSA substantially includes the above-described features of the basic genetic algorithm and also includes certain modifications to the basic genetic algorithm, which are described below. The heuristic that the algorithm seeks to optimize is the number of interactions between the failing function tree and the portion of the change function tree currently under analysis.

Through the course of experimentation using the basic genetic algorithm, several unique attributes of data obtained from case studies were found. These unique attributes lead to modifications in the basic genetic algorithm. For example, one characteristic is that many of the changes in the searched ranges have no functional interactions. This trait of the search space leads to most of the genomes having a heuristic of 0 and thus population selection can stagnate quickly. Adding an increment to a nodefront at the beginning of an iteration loop increases the rate of search space traversal and adds diversity for crossover operations. This feature is included in the HGDLSA.

Another feature that was discovered when analyzing a first round of search data was that a depth limited search of a change was a relatively rapid method of expanding node depths. Accordingly, the HGDLSA employs basic genetic algorithm at a high level to navigate the large search spaces and then switches to a depth limited search to expose the full heuristic of the change for sorting the final genomes (e.g., a prioritized/ordered list of candidate modified source code files).

In the simple example shown in FIG. 6, the HGDLSA traverses the failing function tree to find locally productive areas (e.g., overlaps in nodes of the failing function tree and the change function tree). The only overlap between the failing function tree and the change function tree is the node labeled fA. Therefore, an output of the HGDLSA may be an identifier for a source code file, which includes a change in function fA. Accordingly, for the example of FIG. 6, the output 115 (of FIG. 1) may identify the source code file that includes fA.

Figure 7:
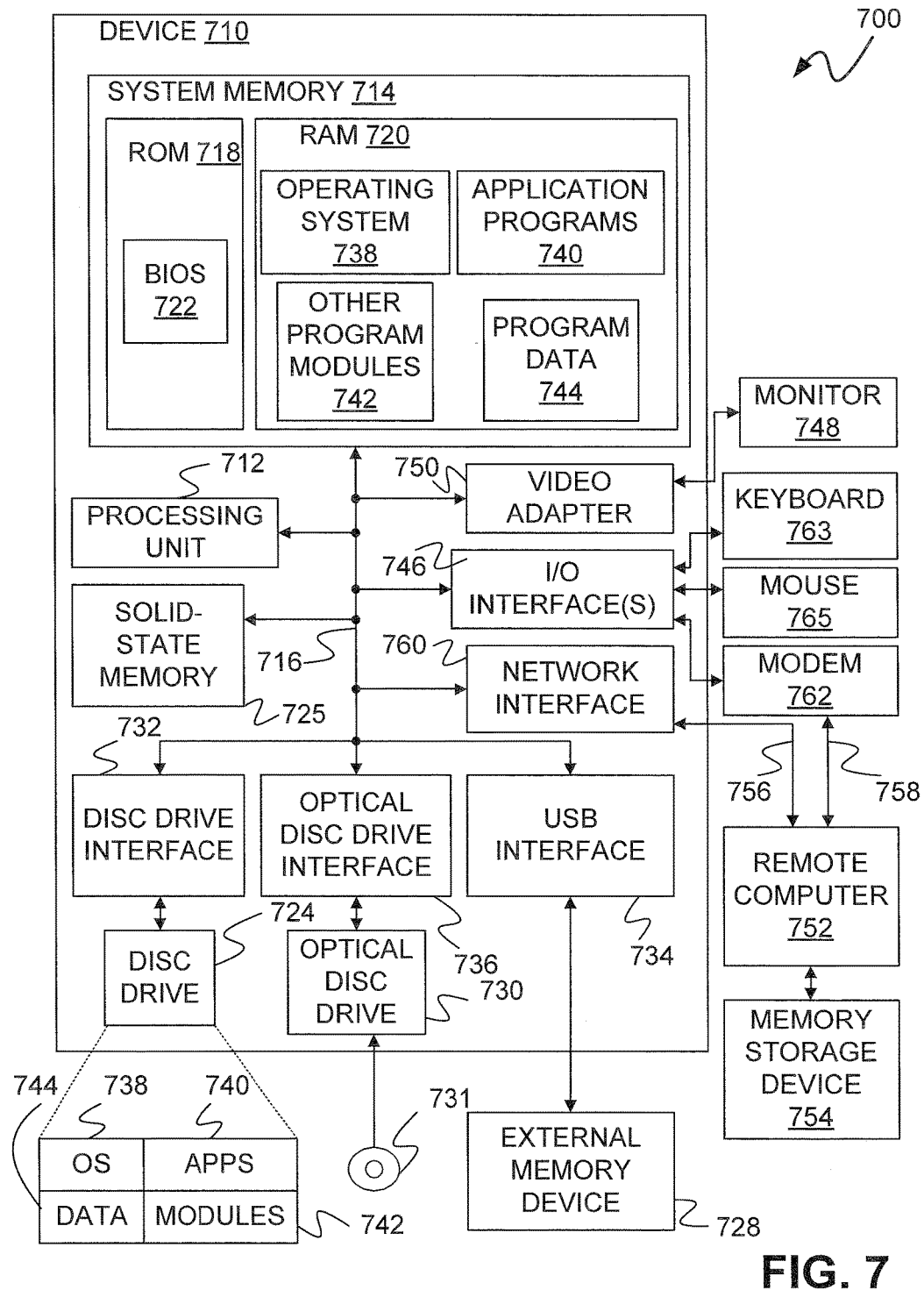
FIG. 7 illustrates an example of a suitable computing environment in which the present embodiments may be implemented.

FIG. 7 illustrates an example of a suitable computing environment 700 in which the present embodiments may be implemented. The computing environment 700 is only one example of a suitable computing environment and is not intended to suggest any limitation as to the scope of use or functionality of the present embodiments.

The computing environment of FIG. 7 includes a processing unit 712, a system memory 714 and a system bus 716 that couples the system memory 714 to the processing unit 712. System memory 714 includes read only memory (ROM) 718 and random access memory (RAM) 720. A basic input/output system 722 (BIOS), containing the basic routines that help to transfer information between elements within the computing device 710, is stored in ROM 718. Computer-executable instructions that are to be executed by processing unit 712 may be stored in random access memory 720 before being executed.

Embodiments of the disclosure can be applied in the context of computer systems other than computing environment 700. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the disclosure may be accomplished utilizing either local or remote storage devices, or simultaneously utilizing both local and remote storage devices.

Computing device 710 further includes a hard disc drive 724, an external memory device 728, and an optical disc drive 730. External memory device 728 can include an external disc drive or solid state memory that may be attached to computing device 710 through an interface such as Universal Serial Bus interface 734, which is connected to system bus 716. Optical disc drive 730 can illustratively be utilized for reading data from (or writing data to) optical media, such as a CD-ROM disc 731. Hard disc drive 724 and optical disc drive 730 are connected to the system bus 716 by a hard disc drive interface 732 and an optical disc drive interface 736, respectively. The drives and external memory devices and their associated non-transitory computer-readable media provide nonvolatile storage media for the computing device 710 on which computer-executable instructions and computer-readable data structures may be stored. Other types of media that are readable by a computer may also be used in the exemplary operation environment.

A number of program modules may be stored in the drives and RAM 720, including an operating system 738, one or more application programs 740, other program modules 742 and program data 744. In particular, application programs 740 can include code used to carry out code failure location functions in accordance with exemplary embodiments, perform analysis of stored binary change records, and display user interfaces for carrying out queries, updates, etc., of the binary change records. Program data 744 may include binary change lists, candidate source code files, etc.

Input devices including a keyboard 763 and a mouse 765 are connected to system bus 716 through an input/output interface 746 that is coupled to system bus 716. Monitor 748 is connected to the system bus 716 through a video adapter 750 and provides graphical images to users. Other peripheral output devices (e.g., speakers or printers) could also be included but have not been illustrated. In accordance with some embodiments, monitor 748 comprises a touch screen that both displays input and provides locations on the screen where the user is contacting the screen.

The computing device 710 may operate in a network environment utilizing connections to one or more remote computers, such as a remote computer 752. The remote computer 752 may be a server, a router, a peer device, or other common network node. Remote computer 752 may include many or all of the features and elements described in relation to computing device 710, although only a memory storage device 754 has been illustrated in FIG. 7. The network connections depicted in FIG. 7 include a local area network (LAN) 756 and a wide area network (WAN) 758. Such network environments are commonplace in the art.

The computing device 710 is connected to the LAN 756 through a network interface 760. The computing device 710 is also connected to WAN 758 and includes a modem 762 for establishing communications over the WAN 758. The modem 762, which may be internal or external, is connected to the system bus 716 via the I/O interface 746. Modem 762 may be a wired modem or wireless modem that receives and transmits signals through an antenna.

In a networked environment, program modules depicted relative to the computing device 710, or portions thereof, may be stored in the remote memory storage device 754. For example, application programs may be stored utilizing memory storage device 754. In addition, data associated with an application program may illustratively be stored within memory storage device 754. It will be appreciated that the network connections shown in FIG. 7 are exemplary and other means for establishing a communications link between the computers, such as a wireless interface communications link, may be used.

In general, the present embodiments are operational with numerous general purpose or special purpose computing system environments or configurations. Examples of well-known computing systems, environments, and/or configurations that may be suitable for use with the present embodiments include, but are not limited to, personal computers, server computers, hand-held or laptop devices, PDAs, multiprocessor systems, microprocessor-based systems, set top boxes, programmable consumer electronics, network PCs, minicomputers, mainframe computers, telephony systems, distributed computing environments that include any of the above systems or devices, and the like.

The present embodiments may be described in the general context of computer-executable instructions, such as program modules, stored on one or more computer-readable storage media (e.g., volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Generally, program modules include routines, programs, objects, components, data structures, etc. that perform particular tasks. The present embodiments may be designed to be practiced in distributed computing environments where tasks are performed by remote processing devices that are linked through a communications network. In a distributed computing environment, program modules are located in both local and remote computer storage media including memory storage devices.

Although the operations in some embodiments are described in a particular sequence, it should be understood that this manner of description encompasses rearrangement. For example, operations described sequentially may in some cases be rearranged or performed to operate in parallel.

It should be noted that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   performing, by a hardware processor, an integration test on a plurality of executable software units, wherein the integration test fails and responsively identifies a symptomatic executable software unit, of the plurality of executable software units, at which the failure of the integration test is detected; and
   locating, by a hardware processor, one or more modified source code files, including instructions responsible for the failure of the integration test, from a plurality of modified source code files by:

searching a binary change database, which maintains a change history related to the plurality of modified source code files, to obtain records of the change history that relate to both the plurality of modified source code files and the plurality of executable software units; and determining, by a hybrid genetic depth limited search algorithm, degrees of functional interaction between portions of modified source code files corresponding to the obtained records of the change history and portions of a source code file corresponding to the symptomatic executable software unit and, based on the determined degrees of functional interaction, identifying, by the hybrid genetic depth limited search algorithm, the one or more modified source code files including the instructions responsible for the failure of the integration test.

2. The method of claim 1 and wherein the obtained records of the change history comprise a subset of all change records stored in the binary change database, and wherein the subset is obtained by a change record filter function configured to receive a starting change record identifier, an ending change record identifier, and a binary changes filter.

3. The method of claim 1 and wherein the hybrid depth limited genetic search algorithm determines the degrees of functional interaction by traversing a directed code graph related to each source code file corresponding to the obtained records of the change history and traversing a directed code graph related to the source code file corresponding to the symptomatic executable software unit.

4. The method of claim 3 and wherein the directed code graph related to each source code file corresponding to the obtained records of the change history and the directed code graph related to the source code file corresponding to the symptomatic executable software unit comprises function nodes and links between the function nodes.

5. The method of claim 4 and wherein each of the function nodes comprises an enumeration that forms a genotype.

6. The method of claim 5 and wherein a phenotype is formed from the genotype.

7. The method of claim 6 and wherein the hybrid genetic depth limited search algorithm carries out the traversal of the directed code graph related to each source code file corresponding to the obtained records of the change history by performing genetic search of a nodefront of the directed code graph related to the respective source code file followed by a depth limited search until interactions are found between one or more nodes of the directed code graph related to the symptomatic function and one or more nodes of the directed code graph of the respective source code file.

8. A computer-readable storage medium having encoded therein computer-executable instructions for causing a computing system programmed thereby to perform a method comprising:

receiving an identifier of a symptomatic executable software unit, of a plurality of executable software units, at which a failure of an integration test is detected; and locating one or more modified source code files, including instructions responsible for the failure of the integration test, from a plurality of modified source code files by:

searching a binary change database, which maintains a change history related to the plurality of modified source code files, to obtain records of the change history that relate to both the plurality of modified source code files and the plurality of executable software units, the obtained records of the change history comprise a subset of all change records stored in the binary change database, and wherein the subset is obtained by a change record filter function configured to receive a starting change record identifier, an ending change record identifier, and a binary changes filter; and determining degrees of functional interaction between portions of modified source code files corresponding to the obtained records of the change history and portions of a source code file corresponding to the symptomatic executable software unit and, based on the determined degrees of functional interaction, identifying the one or more modified source code files including the instructions responsible for the failure of the integration test.

9. The computer-readable storage medium of claim 8 and wherein the determining the degrees of functional interaction and the identifying the one or more modified source code files are carried out by a hybrid genetic depth limited search algorithm.

10. The computer-readable storage medium of claim 9 and wherein the hybrid depth limited genetic search algorithm determines the degrees of functional interaction by traversing a directed code graph related to each source code file corresponding to the obtained records of the change history and traversing a directed code graph related to the source code file corresponding to the symptomatic executable software unit.

11. The computer-readable storage medium of claim 10 and wherein the directed code graph related to each source code file corresponding to the obtained records of the change history and the directed code graph related to the source code file corresponding to the symptomatic executable software unit comprises function nodes and links between the function nodes.

12. The computer-readable storage medium of claim 11 and wherein each of the function nodes comprises an enumeration that forms a genotype.

13. The computer-readable storage medium of claim 12 and wherein a phenotype is formed from the genotype.

14. The computer-readable storage medium of claim 13 and wherein the hybrid genetic depth limited search algorithm carries out the traversal of the directed code graph related to each source code file corresponding to the obtained records of the change history by performing genetic search of a nodefront of the directed code graph related to the respective source code file followed by a depth limited search until interactions are found between one or more nodes of the directed code graph related to the symptomatic function and one or more nodes of the directed code graph of the respective source code file.

15. A system for locating code defects when a software integration tests fails, comprising:

a hardware processor;

a memory;

a code building system that compiles, by the hardware processor, a plurality of modified source code files, outputs a plurality of executable software units, and stores change history records related to the plurality of modified source code files in a binary change database in the memory;

a test system that performs an integration test on the plurality of executable software units and identifies a symptomatic executable software unit, of the plurality of executable software units, when the integration test fails;

a code failure locator tool that locates one or more modified source code files, including instructions responsible for the failure of the integration test, from the plurality of modified source code files by:
  searching a binary change database, which maintains a change history related to the plurality of modified source code files, to obtain records of the change history that relate to both the plurality of modified source code files and the plurality of executable software units; and
  determining, by a hybrid genetic depth limited search algorithm, degrees of functional interaction between portions of modified source code files corresponding to the obtained records of the change history and portions of a source code file corresponding to the symptomatic executable software unit and, based on the determined degrees of functional interaction, identifying, by a hybrid genetic depth limited search algorithm, the one or more modified source code files including the instructions responsible for the failure of the integration test.

16. The system of claim 15 and wherein the code failure locator tool generates a prioritized list of the modified source code files including instructions responsible for the failure of the integration test.

* * * * *